(12) United States Patent
Stockwell

(10) Patent No.: US 10,746,104 B2
(45) Date of Patent: Aug. 18, 2020

(54) PROPULSION SYSTEM

(71) Applicant: ROLLS-ROYCE plc, London (GB)

(72) Inventor: Mark T. Stockwell, Derby (GB)

(73) Assignee: ROLLS-ROYCE plc, London (GB)

( * ) Notice: Subject to any disclaimer, the term of this patent is extended or adjusted under 35 U.S.C. 154(b) by 612 days.

(21) Appl. No.: 15/226,092

(22) Filed: Aug. 2, 2016

(65) Prior Publication Data

US 2017/0058786 A1 Mar. 2, 2017

(30) Foreign Application Priority Data

Aug. 28, 2015 (GB) .................................. 1515279.6

(51) Int. Cl.
F02C 9/28 (2006.01)
F02C 9/26 (2006.01)
F02C 9/42 (2006.01)
F02C 7/042 (2006.01)

(52) U.S. Cl.
CPC ............ F02C 9/285 (2013.01); F02C 7/042 (2013.01); F02C 9/26 (2013.01); F02C 9/42 (2013.01); F05D 2270/04 (2013.01); F05D 2270/071 (2013.01)

(58) Field of Classification Search
CPC ........... F05D 2270/04; F05D 2270/024; F05D 2270/71; F02C 9/26; F02C 9/28
See application file for complete search history.

(56) References Cited

U.S. PATENT DOCUMENTS

| 6,978,597 | B2 * | 12/2005 | McKelvey | F02C 7/262 60/39.27 |
|---|---|---|---|---|
| 7,111,464 | B2 * | 9/2006 | Rowe | F02C 9/28 60/39.281 |
| 2004/0187473 | A1 | 9/2004 | Rowe | |
| 2006/0174629 | A1 * | 8/2006 | Michalko | F02C 9/00 60/774 |
| 2008/0073459 | A1 * | 3/2008 | Cazals | B64C 5/06 244/13 |
| 2014/0297155 | A1 * | 10/2014 | Chen | F02C 9/28 701/100 |

FOREIGN PATENT DOCUMENTS

| EP | 1462634 A2 | 9/2004 |
| GB | 675368 A | 7/1952 |

OTHER PUBLICATIONS

Jan. 17, 2017 Search Report issued in European Patent Application No. 16182291.1.
Feb. 26, 2016 Search Report issued in British Patent Application No. 1515279.6.

* cited by examiner

Primary Examiner — Todd E Manahan
Assistant Examiner — Thuyhang N Nguyen
(74) Attorney, Agent, or Firm — Oliff PLC

(57) ABSTRACT

A propulsion system is disclosed comprising a gas turbine engine and an acceleration schedule which determines the rate of acceleration of the gas turbine engine from an idle condition in response to a demand for increased thrust off-idle. The acceleration schedule determines the rate of acceleration in dependence upon the value of an engine parameter of the engine the value of which is substantially unaltered by variation in the magnitude of an electrical load drawn from the engine while it is operating in the idle condition.

15 Claims, 2 Drawing Sheets

PROPULSION SYSTEM

The present disclosure concerns propulsion systems. More specifically the disclosure concerns the scheduling of acceleration in gas turbine engines away from an idle condition.

For simplicity the following background is provided in the context of acceleration from idle of gas turbine engines on an aircraft. This is not however intended to be limiting.

Aircraft gas turbine engines are typically provided with a generator, powered by a spool of the engine. The generator produces electrical power for use in the engine itself and elsewhere on the aircraft. The electrical power drawn from the engine may have a significant impact on the rate of rotation of the shaft from which the energy is taken. Especially where the engine is operating in an idle condition (be it ground idle, flight idle or approach) the electrical load may absorb a significant proportion of the engine performance. Indeed engines are typically provided with an idle limit ensuring that the idle speed of the engine is sufficient for normal operation of the generator.

It is also normal at any given time for different engines on the aircraft to have a different magnitude of electrical load placed on them during idle. It may be for example that the generator of one engine powers the aircraft galley and the electrical load on that engine is heavily dependent on whether the galley is in operation at that time. The asymmetry in the electrical load placed on the engines may lead to their operating performance being quite different at the point of a demand for acceleration off-idle e.g. for take-off thrust from ground idle. This in turn may lead to significant asymmetry in the rate of acceleration of the engines, each of which is accelerated in accordance with an acceleration schedule. The acceleration schedule accounts for the current operating performance of the relevant engine in order that it is accelerated in a way that will not jeopardise safety and performance (e.g. such that surge margin is maintained). Where different engines have different operating performance when the demand for increased thrust off-idle comes this may lead to different acceleration rates being scheduled for the engines. This in turn may compound any pre-existing thrust asymmetry caused by the different electrical loads placed on the engines at idle.

As engines and aircraft are designed to utilise increasing quantities of electrical power, the need for mitigating asymmetric acceleration (which would otherwise have negative consequences for aircraft handling) is likely to become ever more important.

According to a first aspect there is provided a propulsion system comprising a gas turbine engine and an acceleration schedule which determines the rate of acceleration of the gas turbine engine from an idle condition in response to a demand for increased thrust off-idle, where the acceleration schedule determines the rate of acceleration in dependence upon the value of an engine parameter of the engine the value of which is substantially unaltered by variation in the magnitude of an electrical load drawn from the engine while it is operating in the idle condition. This may mean that differences in electrical load magnitude on the engine do not have a bearing on the acceleration rate demanded from idle. This may be particularly advantageous where there are multiple such engines which may routinely have different electrical loads at idle and it is desirable to prevent significant acceleration asymmetry in the engines.

The idle condition may encompass any one, some or all of ground idle, flight idle and approach idle. Ground idle may be invoked when an aircraft is on the ground by moving a throttle to an idle detent. Ground idle would be typically invoked for all ground operation including taxi and readiness for take-off. Flight idle may be invoked when the aircraft is in flight by moving the throttle to the idle detent. Flight idle would be typically invoked during descent down to approximately 1500 ft. Approach idle may be a higher idle speed than flight idle triggered by landing gear and flap settings and may be used below approximately 1500 ft on approach. In the event of a go-around the increased idle speed of approach idle may allow achievement of a climb-out slope.

In some embodiments the engine is operated to substantially prevent alteration of the value of the engine parameter resulting from variation in the magnitude of the electrical load drawn from the engine while it is operating in the idle condition. In this way it may not be necessary to select an engine parameter for acceleration rate scheduling that inherently remains substantially unchanged as a consequence of electrical load magnitude variation at idle. Instead an engine parameter may be selected and then actively managed by engine operation to negate the impact of any electrical load magnitude variations at idle.

The engine operation to exert control on the value of the engine parameter may for instance be by fuel flow control. Additionally or alternatively adjustment to variable control surfaces e.g. variable vanes may be used to exert or assist in exerting control. Such control may be implemented by means of a schedule for specific control of the engine parameter. The engine parameter may therefore be considered an idle limiter control to be adhered to by adjustment of engine operation. Such an idle limiter may form part of a suite of idle limiter controls used to preserve the ability of the gas turbine engine to meet particular system requirements. Examples of other idle limiter controls include minimum low pressure spool speed limiters (may be advantageous for anti-icing functionality), minimum high pressure compressor gas delivery temperature limiters (advantageous in order that water ingested is evaporated to prevent it reaching the combustor), minimum engine speed limiters for ensuring that an electrical generator is online, minimum pressure limiters for combustor stability and bleed functionality and minimum high pressure spool speed limiters for ground, flight descent and approach.

In some embodiments the engine is operated to maintain the engine parameter at a substantially consistent value while the engine is operating in the idle condition regardless of variation in magnitude of the electrical load drawn from the engine. In this case, not only is the engine parameter value substantially unaltered by variation in the magnitude of the electrical load, but it is further in any case kept substantially constant. This may be a convenient way of increasing the likelihood that two such engines accelerate from idle at substantially the same rate.

In some embodiments the engine parameter is the only variable on which the rate of acceleration determined by the acceleration schedule depends. This may help to ensure that two such engines accelerate from idle at substantially the same rate.

In some embodiments the engine parameter is dependent on multiple further engine parameters. Such further engine parameters could for example be spool speeds.

In some embodiments, in use, electrical power is selectively drawn from a first spool of the gas turbine engine by any one or more of at least one electrical components via a generator. The generator may be a generator of the gas turbine engine or a generator of a broader system such as an aircraft. The electrical components could for instance be components of the gas turbine engine such as computer processors thereof (e.g. an engine electronic controller powered via a permanent magnetic alternator) Additionally or alternatively the electrical components could for instance be electrically operated components of a wider or additional system such as an aircraft (e.g. landing gear, flaps, slats, rudder, anti-icing components galley and onboard entertainment systems).

In some embodiments the gas turbine engine further comprises a second spool.

In some embodiments the engine parameter is dependent on the speed of the two spools. Further it may be that fuel flow is varied to maintain the engine parameter at a substantially consistent value while the engine is operating in the idle condition regardless of variation in magnitude of the electrical load drawn from the first spool. It is further conceivable that in alternative embodiments variable inlet guide vanes for at least one of the compressors on the spools are varied to maintain the engine parameter substantially consistent or else to provide a degree of control in concert with fuel flow variation control.

In some embodiments the first spool is an intermediate pressure spool and the second spool is a high pressure spool. In alternative embodiments however the first spool is a low pressure spool and the second spool is a high pressure spool (e.g. where the engine is a two shaft engine). In further alternative embodiments the first spool may be a high pressure spool and the second spool may be a low or intermediate pressure spool.

In some embodiments the engine parameter is NMix, where:

$$NMix = \sqrt{\frac{HPSpeed^2 + k(IPSpeed^2)}{k+1}}$$

and HPSpeed is the speed of the high pressure spool, IPSpeed is the speed of the intermediate pressure spool and k is an inertia weighted constant. NMix may be an advantageous parameter on which to base acceleration from idle by comparison with scheduling based on measurements of the speed of a single shaft. NMix control may provide an improved balance of the work split between the intermediate pressure and high pressure shafts during acceleration. Specifically use of NMix may give rise to a slower thrust response allowing the intermediate pressure spool to 'catch-up' and provide a greater contribution to the acceleration, thereby reducing high pressure compressor working line excursion.

In some embodiments fuel flow is varied to maintain NMix at a substantially consistent value while the engine is operating in the idle condition regardless of variation in magnitude of the electrical load drawn from the intermediate pressure spool. Thus where higher electrical load is drawn and the intermediate pressure spool rotates slower as a consequence, increased fuel flow may be scheduled, increasing the rate of rotation of the high pressure spool to compensate for the drop in the rate of rotation of the intermediate pressure spool and maintain the NMix value at a consistent level. It is further conceivable that in alternative embodiments variable inlet guide vanes for at least one of an intermediate pressure compressor on the intermediate pressure spool and for a high pressure compressor on the high pressure spool are varied to maintain the NMix value substantially consistent or else to provide a degree of control in concert with fuel flow variation control.

In some embodiments the engine is an aero gas turbine engine.

In some embodiments the propulsion system comprises at least one additional gas turbine engine for which acceleration from an idle condition in response to a demand for increased thrust off-idle is scheduled in dependence upon the value of an engine parameter of the additional engine, the value of which is substantially unaltered by variation in the magnitude of an electrical load drawn from the additional engine while it is operating in the idle condition. An acceleration schedule used to schedule the acceleration of the additional engine may be used for both engines (i.e. it is the acceleration schedule) or an additional acceleration schedule may be provided for use with the additional engine. The disclosure may have particular application to propulsion systems comprising at least two engines as it may help to prevent acceleration from idle asymmetry in the engines.

In some embodiments the engine parameter used with respect to the engine and each of the additional engines is the same parameter.

In some embodiments the additional engine is operated to substantially prevent alteration of the value of the engine parameter resulting from variation in the magnitude of the electrical load drawn from the additional engine while it is operating in the idle condition.

In some embodiments the engine and the additional engine are operated so as the value of the engine parameter with respect to the engine and the value of the engine parameter with respect to the additional engine are kept substantially consistent between the engine and the additional engine while they are operating in the idle condition.

In some embodiments the additional engine is operated to maintain the engine parameter at a substantially consistent value while the additional engine is operating in the idle condition regardless of variation in magnitude of the electrical load drawn from the engine.

As will be appreciated any optional features of the engine may also be applied to one, some or all of the additional engines. Similarly the way in which electrical power is drawn from the engine may also be applied to one, some or all of the additional engines as may the way in the additional engines are operated (e.g. fuel flow control to achieve a significantly consistent Nmix value).

According to a second aspect there is provided a vehicle comprising a propulsion system in accordance with the first aspect. Specifically the vehicle may have multiple gas turbine engines (i.e. the engine and one or more of the additional engines). Operation of these engines in accordance with the invention may reduce asymmetry in acceleration of the engines from idle where they are asymmetrically electrically loaded.

In some embodiments the vehicle is an aircraft.

According to a third aspect there is provided a method of operating a gas turbine engine of a propulsion system, the method comprising;

scheduling a rate of acceleration of the engine from an idle condition in response to a demand for increased thrust off-idle in dependence upon the value of an engine parameter of the engine the value of which is substantially unaltered by variation in the magnitude of an electrical load drawn from the engine while it is operating in the idle condition.

As will be appreciated equivalent method steps with respect to the embodiments of the first and second aspects may be further provided with respect to the third aspect.

According to a fourth aspect there is provided an apparatus comprising:

at least one processor;

at least one memory comprising computer readable instructions;

the at least one processor being configured to read the computer readable instructions and cause performance of the method of the third aspect.

According to a fifth aspect there is provided a computer program that, when read by a computer, causes performance of the method of the third aspect.

According to a sixth aspect there is provided a non-transitory computer readable storage medium comprising computer readable instructions that, when read by a computer, cause performance of the method of the third aspect.

According to a seventh aspect there is provided a signal comprising computer readable instructions that, when read by a computer, cause performance of the method of the third aspect.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

Embodiments will now be described by way of example only, with reference to the Figures, in which.

Figure 1:
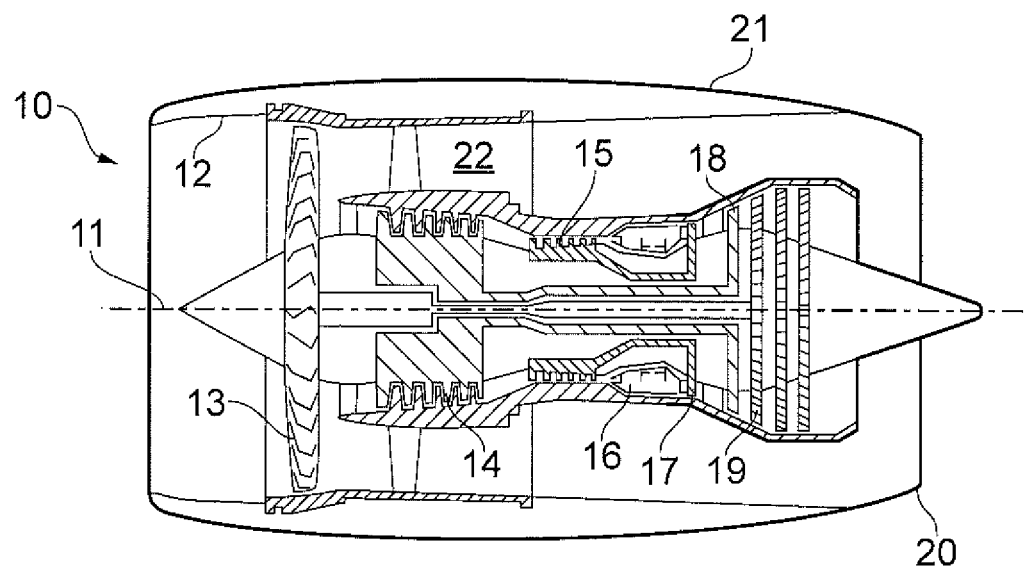
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft. In combination the fan 13, low pressure turbine 19 and respective interconnecting shaft form a low pressure spool. Similarly the intermediate pressure compressor 14, turbine 18 and respective interconnecting shaft form an intermediate pressure spool and the high pressure compressor 15, turbine 17 and respective interconnecting shaft form a high pressure spool.

Forward of the high pressure compressor 15 are an array of variable inlet guide vanes (not shown). The variable inlet guide vanes can be used to vary the angle of attack of air impinging on a first stage of high pressure compressor 15 blades, potentially improving high pressure compressor stability across its range of operating speeds. The variable inlet guide vanes may also be used to change the volume of air passing through the high pressure compressor 15 and thereby the speed of its rotation.

The gas turbine engine 10 further comprises an electric generator (not shown) driven in use by the intermediate pressure spool. In use the electric generator generates electricity for use in the gas turbine engine 10 and in an associated aircraft by various electrical components and systems. The electrical components and systems include for example electric actuation for landing gear, flaps, slats and rudder, anti-icing components, onboard entertainment and a galley.

The gas turbine engine 10 also has an electronic engine control (EEC) (not shown) and an associated memory (not shown). The EEC controls various aspects of operation of the gas turbine engine 10 using sensed data and programs and schedules stored in the memory. One particular function of the EEC is to trim control demands from the flight deck in order to improve performance. This includes scheduling the rate of acceleration of the gas turbine engine 10 from an idle configuration in response to a demand for off-idle acceleration.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

One engine parameter calculated in the EEC is NMix. NMix is a composite parameter calculated according to the formula:

$$NMix = \sqrt{\frac{HPSpeed^2 + k(IPSpeed^2)}{k+1}}$$

where HPSpeed is the speed of the high pressure spool, IPSpeed is the speed of the intermediate pressure spool and k is an inertia weighted constant. As will be appreciated therefore NMix is dependent on the intermediate pressure spool speed and the high pressure spool speed (i.e. two other engine parameters). These spool speeds will vary with engine fuel flow but the intermediate pressure spool speed will also vary in dependence on the electrical load placed on the engine 10 by the electrical components and systems via the generator. Specifically as the electrical load increases the intermediate pressure spool speed will decrease. The value of the engine parameter NMix itself need not however necessarily decrease where the electrical load increases. If the speed of the high pressure spool is increased to compensate for the decrease in the speed of the low pressure spool, the value of NMix can be maintained.

Figure 2:
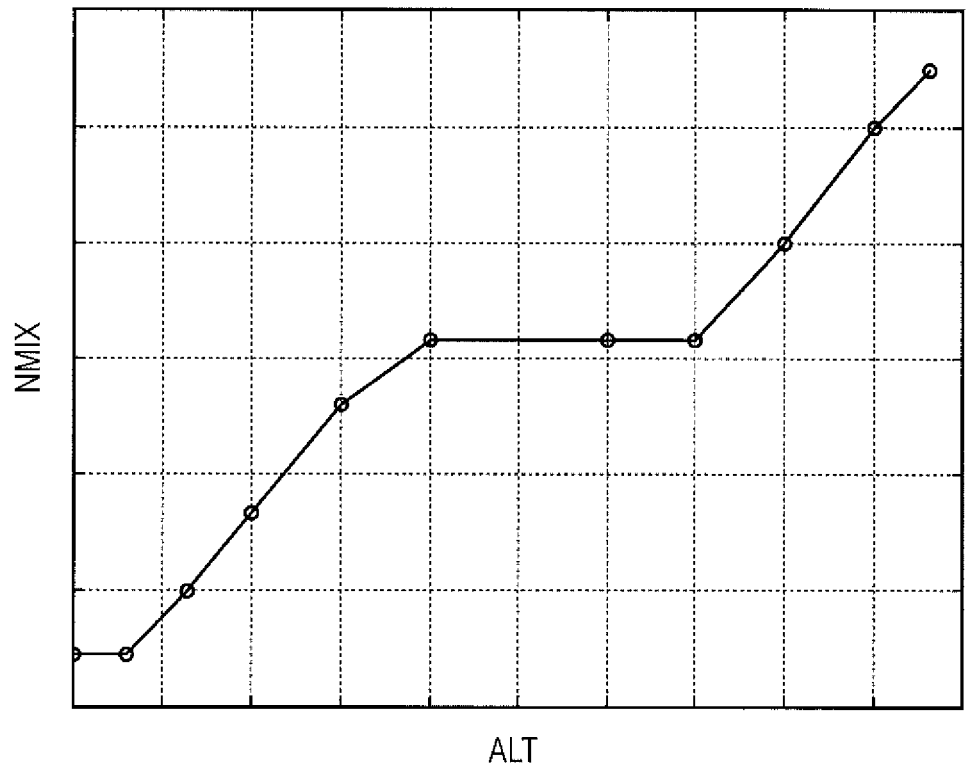
FIG. 2 is a graph showing how the value of the engine parameter NMix demanded may change with altitude in an engine operating in an idle condition in accordance with an embodiment of the invention.

Referring to FIG. 2 an NMix schedule, defining an NMix idle limiter, stored in the memory for use by the EEC is shown. The schedule shows the way in which a demanded NMix changes with aircraft altitude where the engine is in an idle configuration. Idle could be ground idle, flight idle or approach idle. As can be seen the schedule demands a particular NMix for any given altitude. The demanded NMix value at any particular altitude is tailored to the desired performance of the engine 10 (and specifically its intermediate and high pressure spools) at that altitude given an idle condition. Thus the NMix value demanded accounts for expected ambient conditions at that altitude, compressor operability windows including surge margin and ensuring that the engine 10 is primed to safely produce acceleration off-idle if demanded.

Even for a given idle condition throttle setting, factors such as engine 10 electrical load variation and ambient condition changes will tend to cause variation in intermediate and high pressure spool speeds. Thus in order that the demanded NMix at any particular altitude is achieved, the fuel flow is altered by the EEC as necessary. In particular the EEC increases fuel flow to maintain the NMix value where there is an increased electrical load. This EEC controlled adjustment in the fuel flow occurs even though there is no change in the demanded throttle off idle (e.g. a pilot throttle lever remains in an idle setting). In this way the NMix value demanded in accordance with a particular altitude (as per the FIG. 2 schedule) may be achieved, even where engine electrical load variation tending to impact on the NMix value occurs.

Figure 3:
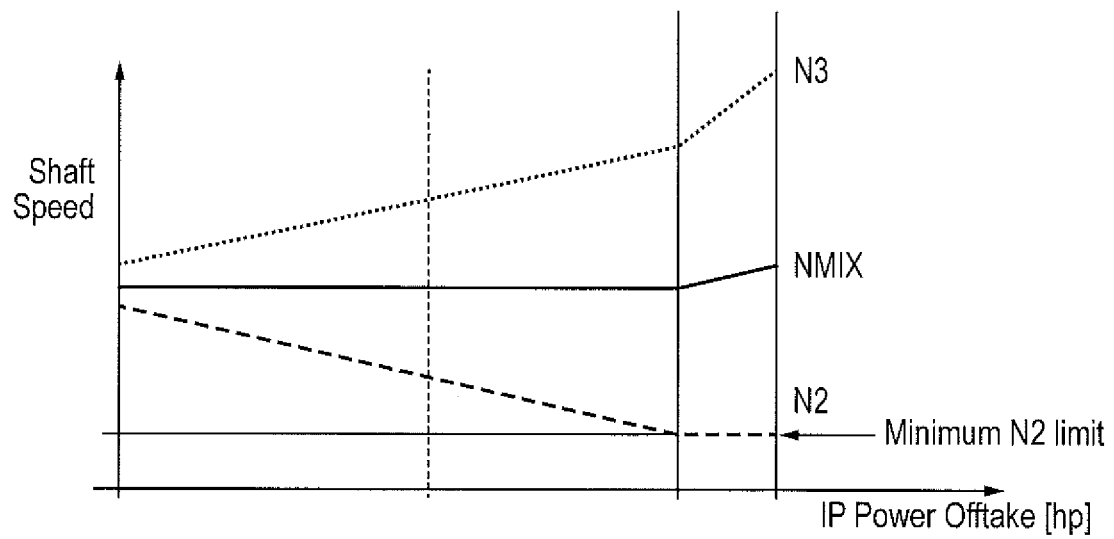
FIG. 3 is a graph showing control of high pressure spool speed, low pressure spool speed and resultant NMix with variation in magnitude of electrical load on a gas turbine engine operating in an idle condition in accordance with an embodiment of the invention.

The impact of fuel flow control variation can be seen with reference to FIG. 3. The graph of FIG. 3 shows the intermediate pressure spool speed (N2) decreasing with increasing engine 10 electrical load. As a consequence of suitable fuel flow control, a decrease in N2 is compensated for by an increase in the high pressure spool speed (N3). This means that the value of NMix (also shown) is maintained at a substantially consistent value regardless of engine 10 electrical load variation. For completeness it is noted that relatively subtle variation in NMix may occur under particularly high engine 10 electrical load conditions. Specifically a minimum N2 limiter may be provided to ensure that N2 is not run down so far by electrical load that the generator is not operated correctly. With N2 then maintained at a consistent minimum value using fuel flow control, it may no longer be possible to control the value of NMix so tightly.

Figure 4:
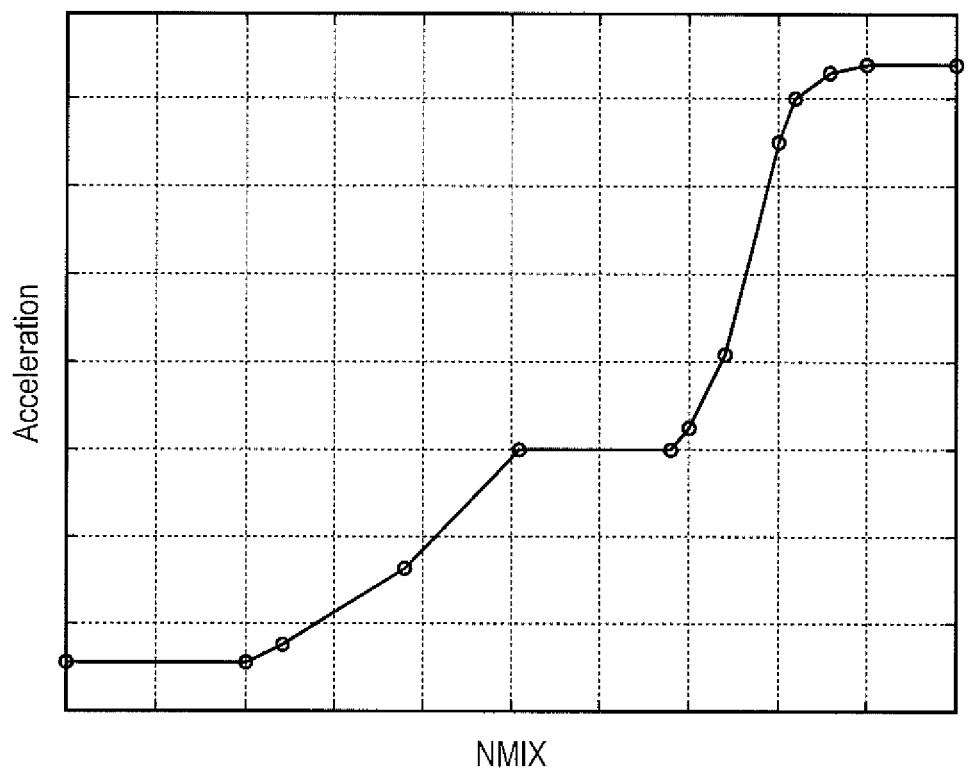
FIG. 4 is a graph showing an acceleration off idle schedule in dependence on the engine parameter NMix.

In use the gas turbine engine 10 forms part of a propulsion system installed on an aircraft. The propulsion system comprises two such aero engines 10 and an acceleration schedule stored in the memory of each engine 10 for use by its EEC. The acceleration schedule (the same for both engines 10) determines the rate of acceleration of the respective engine 10 from an idle condition in response to a demand for increased thrust off-idle. The acceleration schedule is shown in FIG. 4. It shows that the rate of acceleration in response to a demand for increased thrust off-idle is dependent on the value of NMix for the relevant engine at that time. Matching the rate of acceleration to the operating condition (specifically NMix) of the respective gas turbine engine 10 at the relevant time may help to ensure that acceleration does not de-stabilise the engine 10. It may be for example that by altering the rate of acceleration in accordance with NMix the surge margin of the intermediate 14 and high pressure 15 compressors is maintained at acceptable levels.

A further benefit of using NMix in scheduling acceleration of each gas turbine engine 10 may be improved acceleration symmetry between the engines 10. At any particular altitude (which will be the same for each engine 10) each engine 10 is operated to maintain NMix at a substantially consistent value while the engine is operating in the idle condition. This remains the case regardless of variation in magnitude of the electrical load drawn from the respective engine 10. Thus even where the engines 10 have very different electrical loads placed on them, the rate of acceleration of those engines 10 when a demand for off-idle acceleration is received and implemented by the EEC will be substantially consistent, allowing for substantially symmetric engine 10 acceleration, In a specific example the aircraft is on the ground prior to acceleration for take-off with its engines 10 in a ground-idle condition. Each engine 10 has a significantly different electrical load giving rise to significant difference in their respective N2 values. Despite this both engines 10 have substantially the same NMix value in accordance with the NMix schedule, the NMix value in each case being achieved via respective EEC fuel flow control.

At the commencement of a take-off procedure a pilot of the aircraft demands an off-idle acceleration via a cockpit throttle control. The rate of acceleration of each engine 10 is then controlled by the respective EEC in dependence on NMix as per the respective acceleration schedule. Because both engines 10 have substantially the same NMix value when the demand for off-idle acceleration is received, and because the acceleration schedule for each engine 10 is the same, the rate of acceleration for both engines 10 is substantially matched. Thus any pre-existing thrust difference in engines 10 at ground-idle is not exacerbated and significant thrust asymmetries are avoided. In short the engine's steady state condition at idle and its acceleration from idle are tied together by an NMix limiter and an acceleration schedule dependent on NMix. This reduces asymmetric acceleration caused by different electrical loads on the engines 10.

It will be understood that the invention is not limited to the embodiments above-described and various modifications and improvements can be made without departing from the concepts described herein. By way of example particular attention has been given above to a ground idle condition example, but the disclosure is also applicable to other idle conditions. Furthermore particular attention has been given above to maintenance of the NMix value using fuel flow control, but additional or alternative control mechanisms may be used and/or may contribute (including for instance use of variable control surfaces e.g. variable stators). Except where mutually exclusive, any of the features may be employed separately or in combination with any other features and the disclosure extends to and includes all combinations and sub-combinations of one or more features described herein.

The invention claimed is:

1. A propulsion system comprising a gas turbine engine and an acceleration schedule which determines a rate of acceleration of the gas turbine engine from an idle condition in response to a demand for increased thrust off-idle, where the acceleration schedule determines the rate of acceleration in dependence upon a value of an engine parameter of the gas turbine engine, the value of which is unaltered by variation in a magnitude of an electrical load drawn from the gas turbine engine while the gas turbine engine is operating in the idle condition, except for when a speed of a first spool is at a predetermined minimum speed, wherein the gas turbine engine further comprises a second spool and the engine parameter is a function of the speed of the first spool and a speed of the second spool, and the electrical load is coupled to the first spool and configured to draw electrical power from the first spool to provide to the gas turbine engine.

2. The propulsion system according to claim 1, wherein the gas turbine engine is operated to prevent alteration of the value of the engine parameter resulting from variation in the magnitude of the electrical load drawn from the gas turbine engine while the gas turbine engine is operating in the idle condition.

3. The propulsion system according to claim 1, wherein the gas turbine engine is operated to maintain the engine parameter at a consistent value while the gas turbine engine is operating in the idle condition regardless of variation in magnitude of the electrical load drawn from the gas turbine engine.

4. The propulsion system according to claim 2, wherein the gas turbine engine operation to exert control on the value of the engine parameter while the gas turbine engine is operating in the idle condition is by fuel flow control.

5. The propulsion system according to claim 1, wherein the engine parameter is the only variable on which the rate of acceleration determined by the acceleration schedule depends.

6. The propulsion system according to claim 1, wherein the engine parameter is dependent on multiple further engine parameters.

7. The propulsion system according to claim 1, wherein, in use, electrical power is selectively drawn from the first spool of the gas turbine engine by any one or more of at least one electrical components via a generator.

8. The propulsion system according to claim 1, wherein the first spool is an intermediate pressure spool and the second spool is a high pressure spool.

9. The propulsion system according to claim 8, wherein the engine parameter is NMix, where:

$$NMix = \sqrt{\frac{HPSpeed^2 + k(IPSpeed^2)}{k+1}}$$

and HPSpeed is the speed of the high pressure spool, IPSpeed is the speed of the intermediate pressure spool and k is an inertia weighted constant.

10. The propulsion system according to claim 9, wherein fuel flow is varied to maintain Nmix at a consistent value while the gas turbine engine is operating in the idle condition regardless of variation in magnitude of the electrical load drawn from the intermediate pressure spool except for when the speed of the intermediate pressure spool is at the predetermined minimum speed.

11. The propulsion system according to claim 1, wherein the engine is an aero gas turbine engine.

12. The propulsion system according to claim 1, wherein the propulsion system comprises at least one additional gas turbine engine for which acceleration from an idle condition in response to a demand for increased thrust off-idle is scheduled in dependence upon a value of an engine parameter of the at least one additional engine, the value of the at least one additional engine is unaltered by variation in a magnitude of an electrical load drawn from the at least one additional engine while the at least one additional gas turbine engine is operating in the idle condition except for when a speed of a spool of the at least one additional gas turbine engine is at a predetermined minimum speed.

13. A vehicle comprising the propulsion system in accordance with claim 1.

14. A method of operating a gas turbine engine of a propulsion system, the method comprising:
   scheduling a rate of acceleration of the gas turbine engine from an idle condition in response to a demand for increased thrust off-idle in dependence upon a value of an engine parameter of the gas turbine engine, the value of which is unaltered by variation in a magnitude of an electrical load drawn from the gas turbine engine while the gas turbine engine is operating in the idle condition, except for when a speed of a first spool is at a predetermined minimum speed, wherein
   the engine parameter is a function of the speed of the first spool and a speed of a second spool of the gas turbine engine, and
   the electrical load is coupled to the first spool and configured to draw electrical power from the first spool to provide to the gas turbine engine.

15. A propulsion system comprising a gas turbine engine having (1) a first spool selected from a low pressure spool an intermediate pressure spool, and further having (2) a second spool that is a high pressure spool and an electronic engine control configured to provide an acceleration schedule which determines a rate of acceleration of the gas turbine engine from an idle condition in response to a demand for increased thrust off-idle, where the acceleration schedule determines the rate of acceleration in dependence upon a value of an engine parameter of the gas turbine engine, the value of which is unaltered by variation in a magnitude of an electrical load drawn from the gas turbine engine while the gas turbine engine is operating in the idle condition, except for when a speed of the first spool is at a predetermined minimum speed, wherein
   the engine parameter is a function of the speed of the first spool and a speed of a second spool of the gas turbine engine, and
   the electrical load is coupled to the first spool and configured to draw electrical power from the first spool to provide to the gas turbine engine.

* * * * *